United States Patent [19]

Kazumi

[11] Patent Number: 5,343,267
[45] Date of Patent: Aug. 30, 1994

[54] CAMERA

[75] Inventor: Jiro Kazumi, Kanagawa, Japan

[73] Assignee: Canon Kabushiki Kaisha, Tokyo, Japan

[21] Appl. No.: 920,920

[22] Filed: Jul. 28, 1992

[30] Foreign Application Priority Data

Jul. 31, 1991 [JP] Japan .................. 3-191992

[51] Int. Cl.⁵ .............................................. G03B 7/00
[52] U.S. Cl. ............................... 354/410; 354/412; 354/289.1; 354/289.12
[58] Field of Search ............... 354/412, 105, 106, 107, 354/108, 109, 21, 410, 442, 443, 432, 289.1, 289.12

[56] References Cited

U.S. PATENT DOCUMENTS

| | | | |
|---|---|---|---|
| 4,286,849 | 9/1981 | Uchidoi et al. | 354/217 |
| 4,853,733 | 8/1989 | Watanabe et al. | 354/412 |
| 4,855,779 | 8/1989 | Ishikawa et al. | 354/412 |
| 4,999,661 | 3/1991 | Ueno et al. | 354/412 |
| 5,097,283 | 3/1992 | Kazumi | 354/412 |
| 5,177,526 | 1/1993 | Sasagaki et al. | 354/432 |
| 5,181,062 | 1/1993 | Kazumi | 354/412 |
| 5,184,169 | 2/1993 | Nishitani | 354/412 |

Primary Examiner—Russell E. Adams
Attorney, Agent, or Firm—Fitzpatrick, Cella, Harper & Scinto

[57] ABSTRACT

A camera system comprises a camera body and an information supply device. The camera body includes a selection part for selecting by operating an operation member a combination of a plurality of control items preset for photographing, an input part for inputting a supply information from the information supply device, and a correction part for correcting at least one control item of the combination of control items being selected by the selection part on the basis of the supply information. The information supply device includes an information forming part for forming the supply information for correction of at least one control item of the combination of control items selected by the selection part of the camera body.

18 Claims, 8 Drawing Sheets

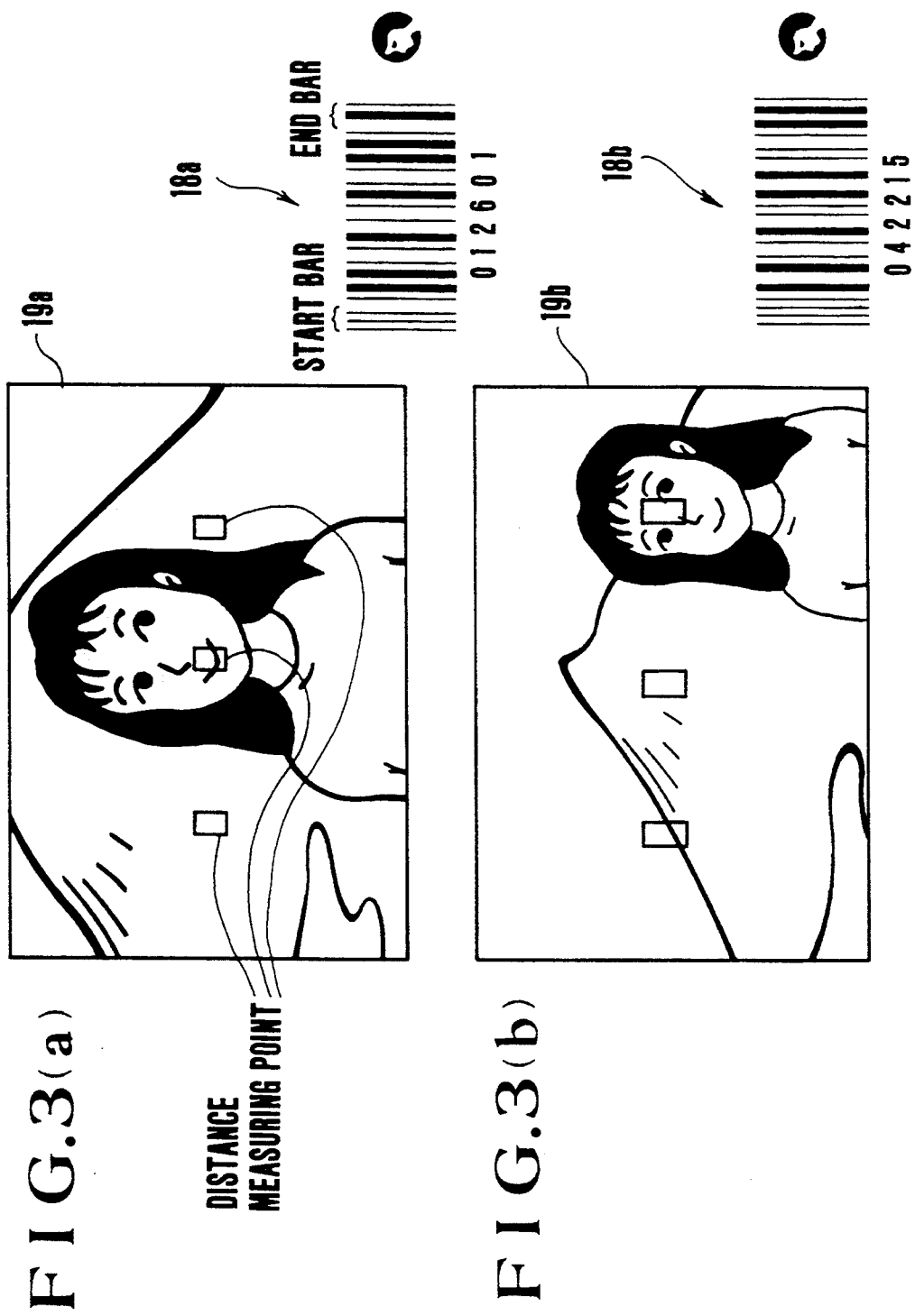

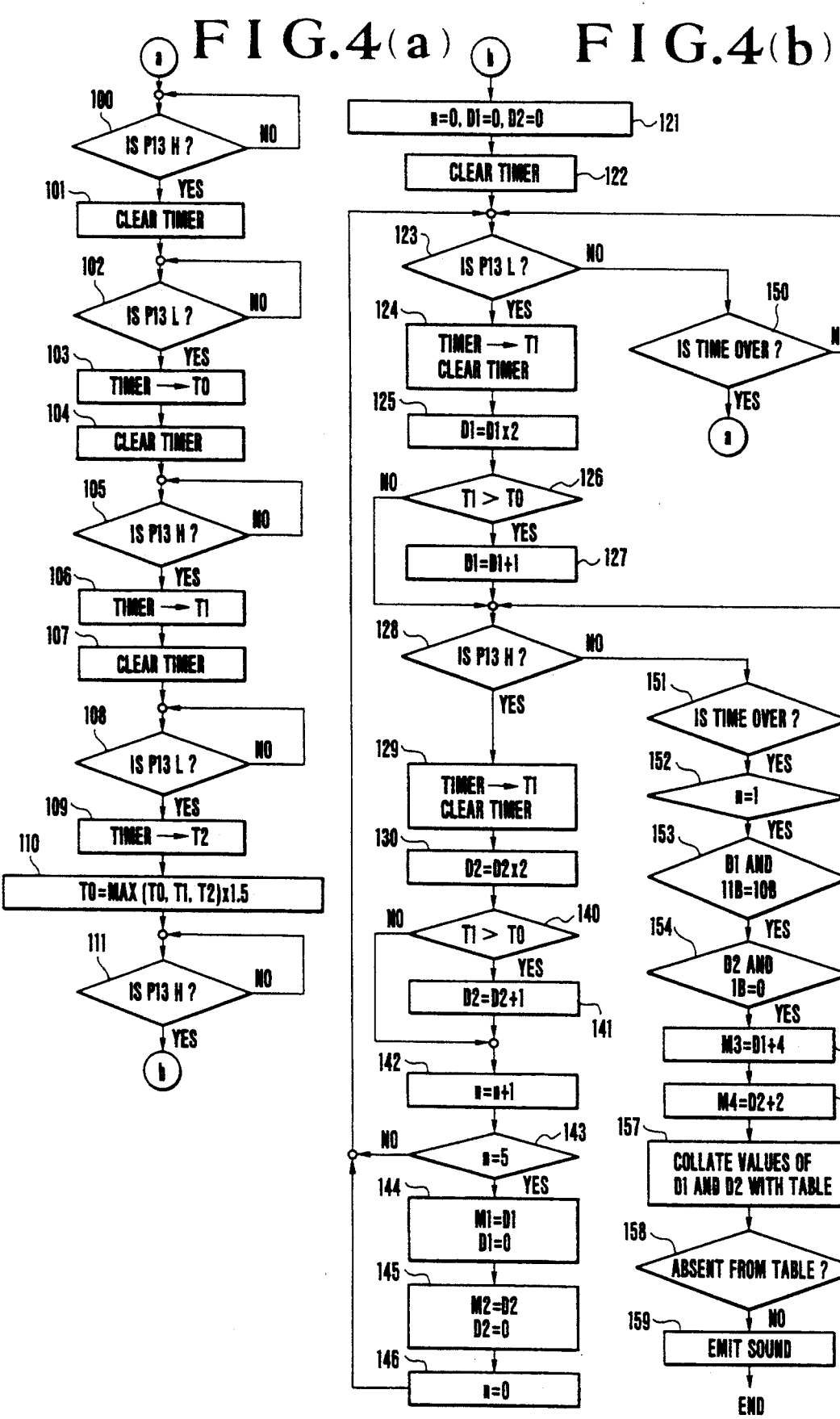

FIG.5

| FIRST DIGIT | (1) |
|---|---|
| 0 | ONE-SHOT AF; SINGLE SHOOTING; CENTER-WEIGHTED |
| 1 | ONE-SHOT AF; CONTINUOUS SHOOTING; CENTER-WEIGHTED |
| 2 | SERVO AF; SINGLE SHOOTING; CENTER-WEIGHTED |
| 3 | SERVO AF; CONTINUOUS SHOOTING; CENTER-WEIGHTED |
| 4 | ONE-SHOT AF; SINGLE SHOOTING; PARTIAL |
| 5 | ONE-SHOT AF; CONTINUOUS SHOOTING; PARTIAL |
| 6 | SERVO AF; SINGLE SHOOTING; PARTIAL |
| 7 | SERVO AF; CONTINUOUS SHOOTING; PARTIAL |

| SECOND DIGIT | (2) |
|---|---|
| 1 | SELECT CENTRAL DISTANCE MEASURING POINT |
| 2 | SELECT LEFT DISTANCE MEASURING POINT |
| 3 | SELECT CENTRAL AND LEFT DISTANCE MEASURING POINTS |
| 4 | SELECT RIGHT DISTANCE MEASURING POINT |
| 5 | SELECT CENTRAL AND RIGHT DISTANCE MEASURING POINTS |
| 6 | SELECT LEFT AND RIGHT DISTANCE MEASURING POINTS |
| 7 | SELECT ALL DISTANCE MEASURING POINTS |

| THIRD DIGIT | (3) |
|---|---|
| 0 | PROGRAM |
| 1 | TV PRIORITY |
| 2 | AV PRIORITY |
| 3 | FLASH PROGRAM |

| FOURTH DIGIT | (4) | | |
|---|---|---|---|
| 0 | 22 | 30 SEC | 0 |
| 1 | 16 | 15 SEC | +1/2 |
| 2 | 11 | 4 SEC | +1 |
| 3 | 8.0 | 1 SEC | +1 1/2 |
| 4 | 5.6 | 1/4 | +2 |
| 5 | 4.0 | 1/15 | +2 1/2 |
| 6 | 2.8 | 1/60 | -2 |
| 7 | 2.0 | 1/250 | -1 1/2 |
| 8 | 1.4 | 1/1000 | -1 |
| 9 | 1.0 | 1/4000 | -1/2 |

FIG.8
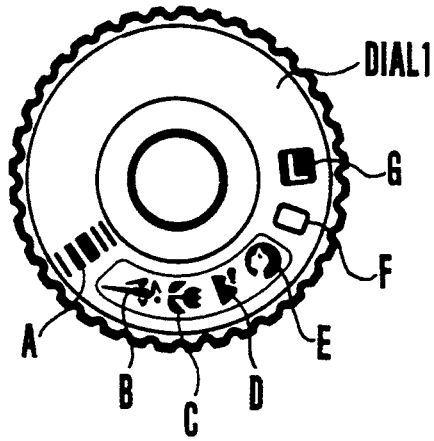
FIG.9
| | | d1 | d2 | d3 | d4 | n |
|---|---|---|---|---|---|---|
| ▐ | (LOCK) | × | × | × | × | 0 |
| ▢ | (FULL-AUTOMATIC) | 0 | 7 | 0 | 0 | 1 |
| ☻ | (PORTRAIT) | 1 | 7 | 2 | 6 | 2 |
| ⛰ | (LANDSCAPE) | 0 | 7 | 2 | 4 | 3 |
| ❀ | (CLOSE-UP) | 4 | 1 | 2 | 4 | 4 |
| 🏃 | (SPORTS) | 3 | 7 | 1 | 7 | 5 |
| ||||| | (BAR CODE) | 0 | 7 | 0 | 0 | 6 |
FIG.10
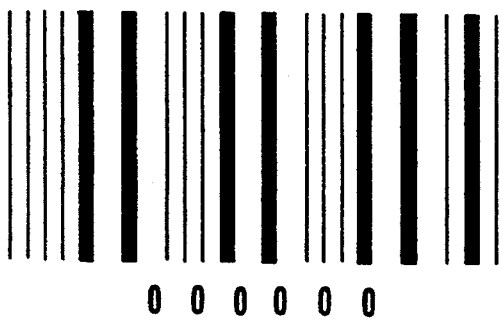

CAMERA

BACKGROUND OF THE INVENTION

1. Field of the Invention:

This invention relates to a camera arranged to be capable of receiving signals transmitted from a device for supplying information.

2. Description of the Related Art:

The inventor of the invention of the present application has previously proposed, in U.S. Pat. No. 5,097,283, an information supply device which is arranged in combination with a camera body to be capable of inputting all at once information on a plurality of control items such as an AE (automatic exposure control) mode, an AF (automatic focusing) mode, a film transport mode, etc. According to the method proposed, a bar code printed on an external information recording medium is read out by means of an information reading-and-supply device which includes a bar-code reader, and the bar-code information read out is supplied to the camera body through optical communication. Upon receipt of the bar-code information, on the side of the camera body, a camera control pattern corresponding to the bar-code information is read out from a memory circuit, and the AE mode, the AF mode and the film transport mode are determined accordingly.

The bar-code information has no concrete control pattern for the AE, AF and film transport modes and is nothing more than trigger information for deriving, from the memory circuit disposed within the camera body, one of various control patterns stored therein. Therefore, the bar-code information can be arranged in a small amount.

Meanwhile, another method has been proposed as disclosed in U.S. Pat. No. 4,853,733. According to that method, a bar code printed on an external information recording medium is read out by an information reading-and-supply device including a bar-code reader, and the bar-code information read out is supplied to a camera body as an electrical signal. In that instance, the bar-code information is arranged to show a concrete control value to be employed for the AE or AF mode.

SUMMARY OF THE INVENTION

One aspect of this invention lies in the provision of an improvement on the method previously proposed by the inventor of the present application. In accordance with that improvement, a camera is arranged to make any of various control patterns selectable by an operation on the camera body and to correct the selected control pattern according to information inputted from an information supply device, so that the control pattern can be simply set according to various shooting conditions.

The above and other aspects and features of the invention will become apparent from the following detailed description of an embodiment thereof taken in connection with the accompanying drawings.

BRIEF DESCRIPTION OF THE DRAWINGS

FIGS. 3(a) and 3(b) show information inputs to the camera from the above-stated bar-code reader.

FIGS. 4(a) and 4(b) are flow charts showing a bar-code reading operation.

FIG. 5 is a table showing the items of control.

FIG. 8 is a plan view showing a dial DIAL1.

FIG. 9 is a table showing in detail control items registered for every one of photographing conditions arranged to be selectable by the dial DIAL1.

FIG. 10 shows an example of a bar code.

DETAILED DESCRIPTION OF THE PREFERRED EMBODIMENT

Figure 1:
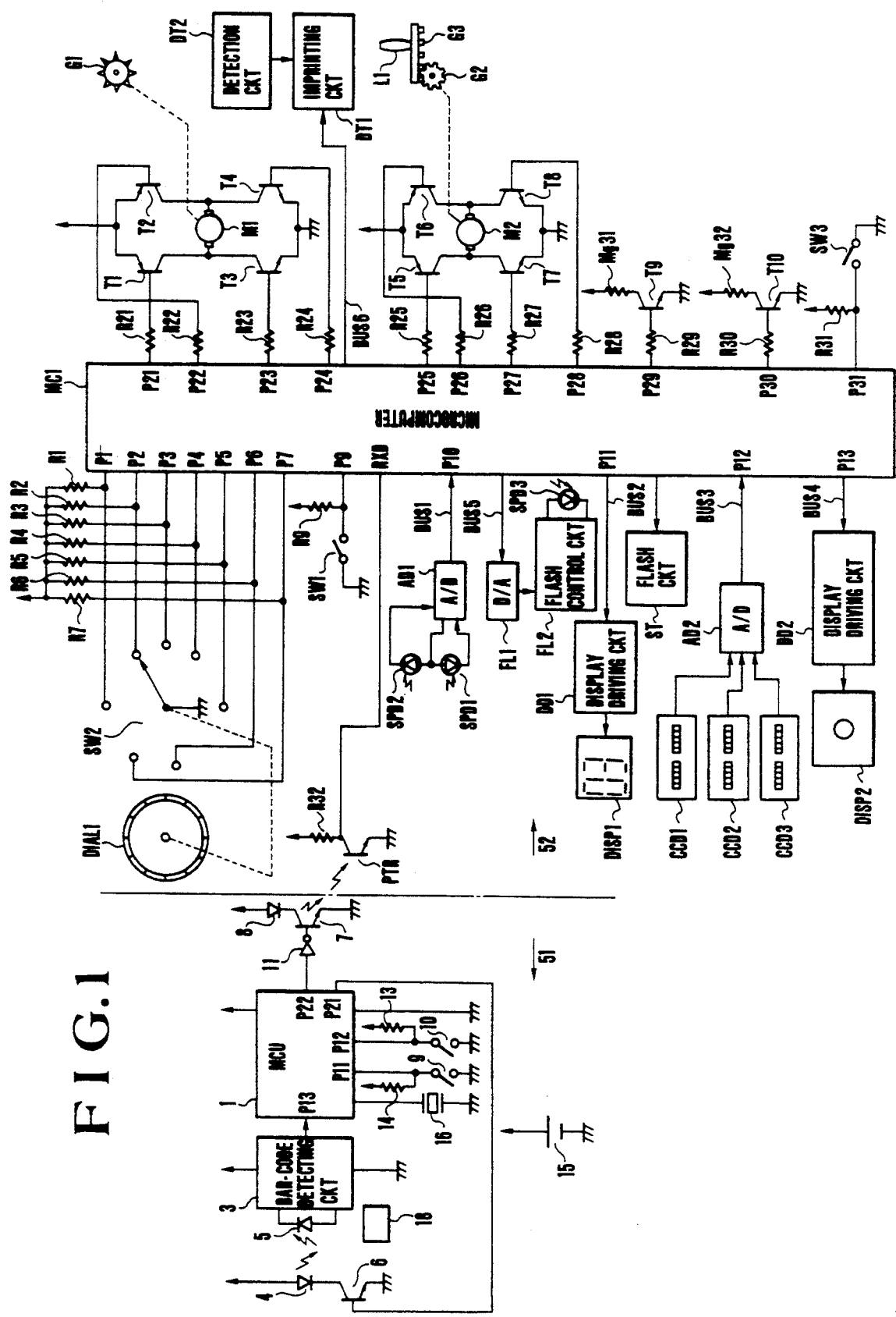
FIG. 1 is a block diagram showing in outline the electric circuit arrangement of a camera which is arranged as an embodiment of this invention.

FIG. 1 is a block diagram showing an embodiment of this invention. In FIG. 1, a part 51 on the left side of the drawing shows in outline the electric circuit arrangement of a bar-code reader, and a part 52 on the right side of the drawing shows that of a camera body.

On the side of the bar-code reader 51, a one-chip microcomputer (hereinafter referred to as MCU) 1 is arranged to perform control over a bar-code reading action. The MCU 1 consists of a CPU, a ROM, a RAM, an IO, a serial communication interface (hereinafter referred to as SCI) and a timer. In the MCU 1, an input port P13 is connected to the output terminal of a bar-code detecting circuit 3. Other input ports P11 and P12 are connected, respectively, to a switch 9 which is provided for reading a bar code and to a switch 10 which is provided for supplying the information read out to the camera body. The input ports P11 and P12 are pull-up connected, to a power supply through resistors 14 and 13. An output port P21 of the MCU 1 is connected to the base of a transistor 6. An output port P22 of the SCI of the MCU 1 is connected to the input terminal of a NOT circuit 11. The output terminal of the NOT circuit 11 is connected to the base of a transistor 7.

The transistor 6 has its collector connected to an infrared ray emitting diode (hereinafter referred to as IRED) 4. A silicon photodiode (hereinafter referred to as SPD) 5 is arranged to detect the reflected light from a code part (hereinafter referred to as a bar-code part) 18. The bar-code part 18 which is composed of black bars and white spaces is arranged to be illuminated by the light emitted by the IRED 4 and to be thus optically readable. The bar-code detecting circuit 3 is arranged to detect the output of the SPD 5, to output a low-level output upon detection of the white space part of the bar-code part 18 and a high-level output upon detection of the black bar part of the bar-code part 18.

The transistor 7 has its collector connected to an IRED 8. A power source battery 15 is arranged to supply power to the MCU 1, the bar-code detecting circuit 3, the IRED 4, the IRED 8, etc. A sound emitting element 16 is arranged to indicate that the bar-code reading is accurately accomplished. The SCI of the MCU 1 is arranged to output an asynchronous signal which consists of eight bits for a character length, two bits for a stop and one bit for a start. The same signal is arranged to be inputted to the SCI of a microcomputer MC1 which is disposed on the side of the camera body 52.

The camera body 52 is arranged as follows: The microcomputer MC1 of the camera body 52 is arranged to control the actions of the camera. A rotary switch SW2 is arranged to rotate in association with the rotation of a dial DIAL1. Ports P1, P2, P3, P4, P5, P6 and P7 are input ports. One of these input ports is turned on by the rotation of the dial DIAL1 while all other input ports remain off.

There are provided pull-up resistors R1, R2, R3, R4, R5, R6 and R7. The dial DIAL1 is provided with pictorial marks which are shown in FIG. 8. Referring to FIG. 8, these pictorial marks respectively indicate, from the left side of the drawing, an external input mode A in which the camera body receives an input from external information input means; a sport mode B; a close-up mode C; a landscape mode D; a portrait mode E; a full-automatic mode F; and a lock (camera action inhibiting) mode G.

An input port P9 is responsive to the shutter release button SW1 of the camera. A pull-up resistor R9 is arranged to give a low-level signal input to the input port P9 when the release button SW1 turns on.

Silicon photodiodes SPD1 and SPD2 are provided for light measuring actions. The silicon photodiode SPD1 is provided for a center-weighted light measuring action which is performed with weight attached to the central part of a picture. The silicon photodiode SPD2 is provided for a partial light measuring action which is performed by measuring the light of a part of a picture. An A/D converter AD1 is arranged to convert the signals of the silicon photodiodes SPD1 and SPD2, which is of an analog value, into a digital value and to transmit the digital value data thus obtained to the microcomputer MC1 through a bus line BUS1. An input port P10 is arranged to receive the A/D (analog-to-digital) converted value data from the A/D converter AD1.

A display driving circuit DD1 is arranged to drive a display device DISP1. An output port P11 is arranged to send a signal to the display driving circuit DD1 through a bus line BUS2.

Line sensors CCD1, CCD2 and CCD3 are provided for distance measurement. These line sensors CCD1, CCD2 and CCD3 are arranged to be used for measuring distances to different distance measuring points, respectively. For example, the line sensor CCD1 is for a center distance measuring point while the line sensors CCD2 and CCD3 are for left and right distance measuring points. An A/D converter AD2 is arranged to convert each of the analog value signals of the line sensors CCD1, CCD2 and CCD3 into a digital value and to send the digital value data thus obtained to the microcomputer MC1 through a bus line BUS3. An input port P12 of the microcomputer MC1 is provided for receiving the A/D converted value data from the A/D converter AD2.

A display device DISP2 is arranged to display the state of focusing at the inside of the viewfinder or the like of the camera. A display driving circuit DD2 is arranged to drive the display device DISP2. An output port P13 is provided for sending a signal to the display driving circuit DD2 through a bus line BUS4.

A motor M1 is arranged to transport a film which is not shown. The collector of a PNP transistor T1 and that of an NPN transistor T3 are connected to one end of the motor M1. To the other end of the motor M1 are connected the collector of a PNP transistor T2 and that of an NPN transistor T4. The emitters of the PNP transistors T1 and T2 are connected to the positive side of the power supply voltage, and those of the NPN transistors T3 and T4 are connected to the negative side of the power supply voltage.

The bases of the PNP transistors T1 and T2 are connected to the output ports P21 and P22 of the microcomputer MC1, respectively, through base resistors R21 and R22. The bases of the NPN transistors T3 and T4 are connected to the output ports P23 and P24 of the microcomputer MC 1, respectively, through base resistors R23 and R24.

As apparent from the arrangement described, when the transistors T1 and T4 are on, a current flows from the left to the right to rotate the motor M1 rightward. The rightward rotation of the motor M1 causes a film winding action and a shutter charging action to be performed. When the transistors T2 and T3 are on, a current flows from the right to the left. The leftward rotation of the motor M1 causes a film rewinding action to be performed. For this purpose, the motor M1 is connected to a sprocket G1.

A motor M2 is arranged to move a photo-taking optical system L1 in the direction of an optical axis. The collector of a PNP transistor T5 and that of an NPN transistor T7 are connected to one end of the motor M2. To the other end of the motor M2 are connected the collector of a PNP transistor T6 and that of an NPN transistor T8. The emitters of the PNP transistors T5 and T6 are connected to the positive side of the power supply voltage. The emitters of the NPN transistors T7 and T8 are connected to the negative side of the power supply voltage. The bases of the PNP transistors T5 and T6 are connected to output ports P25 and P26 of the microcomputer MC1 through base resistors R25 and R26. The bases of the NPN transistors T7 and T8 are connected to output ports P27 and P28 of the microcomputer MC1 respectively through base resistors R27 and R28. When the transistors T5 and T8 are on, a current flows from the left to the right to rotate the motor M2 rightward. The rightward rotation of the motor M2 causes the photo-taking optical system L1 to be drawn out (to be moved forward in the direction of the optical axis) through a pinion gear G2 and a rack G3. When the transistors T6 and T7 are on, a current flows from the right to the left to rotate the motor M2 leftward. The leftward rotation of the motor M2 causes the photo-taking optical system L1 to be drawn in (to be moved rearward in the direction of the optical axis).

An NPN transistor T9 is a switching transistor. The NPN transistor T9 has its emitter grounded; its collector connected to the positive side of the power supply voltage through a magnet coil Mg31; and its base connected to an output port P29 of the microcomputer MC1 through a base resistor R29. When this transistor T9 turns on, a current is applied to the magnet coil Mg31 to cause the leading curtain of a shutter which is not shown to travel. An NPN transistor T10 is also a switching transistor, which has its emitter grounded and its collector connected to the negative side of the power supply voltage through a magnet coil Mg32. When this transistor T10 turns on, a current is applied to the magnet coil Mg32 to cause the trailing curtain of the shutter to travel. A base resistor R30 is arranged for an output port P30 of the microcomputer MC1.

A switch SW3 is arranged to turn on when a flash device is to be used. The switch SW3 is connected to an input port P31 of the microcomputer MC1 with a pull-up resistor R31 arranged in such a way as to enable the microcomputer MC1 to detect whether or not the flash device is mounted on the camera.

A phototransistor PTR is arranged to receive a signal from the IRED 8 of the bar-code reader 51. The collector of the phototransistor PTR is pulled up to the power supply by a resistor R32 and is connected to an input port RXD of the microcomputer MC1.

A D/A (digital-to-analog) converter FL1 is arranged to convert an input from a bus line BUS5 into an analog value. A flash control circuit FL2 is arranged to compare the analog output of the D/A converter FL1 with the output of a silicon photodiode SPD3, which is disposed normally on the lower side of a mirror box and receives flash light. The flash control circuit FL2 sends a flashing stop signal to a flash circuit ST according to the result of the comparison. In other words, the light-quantity level of flash control is adjustable according to the signal sent from the microcomputer MC1 through the bus line BUS5.

Figure 2:
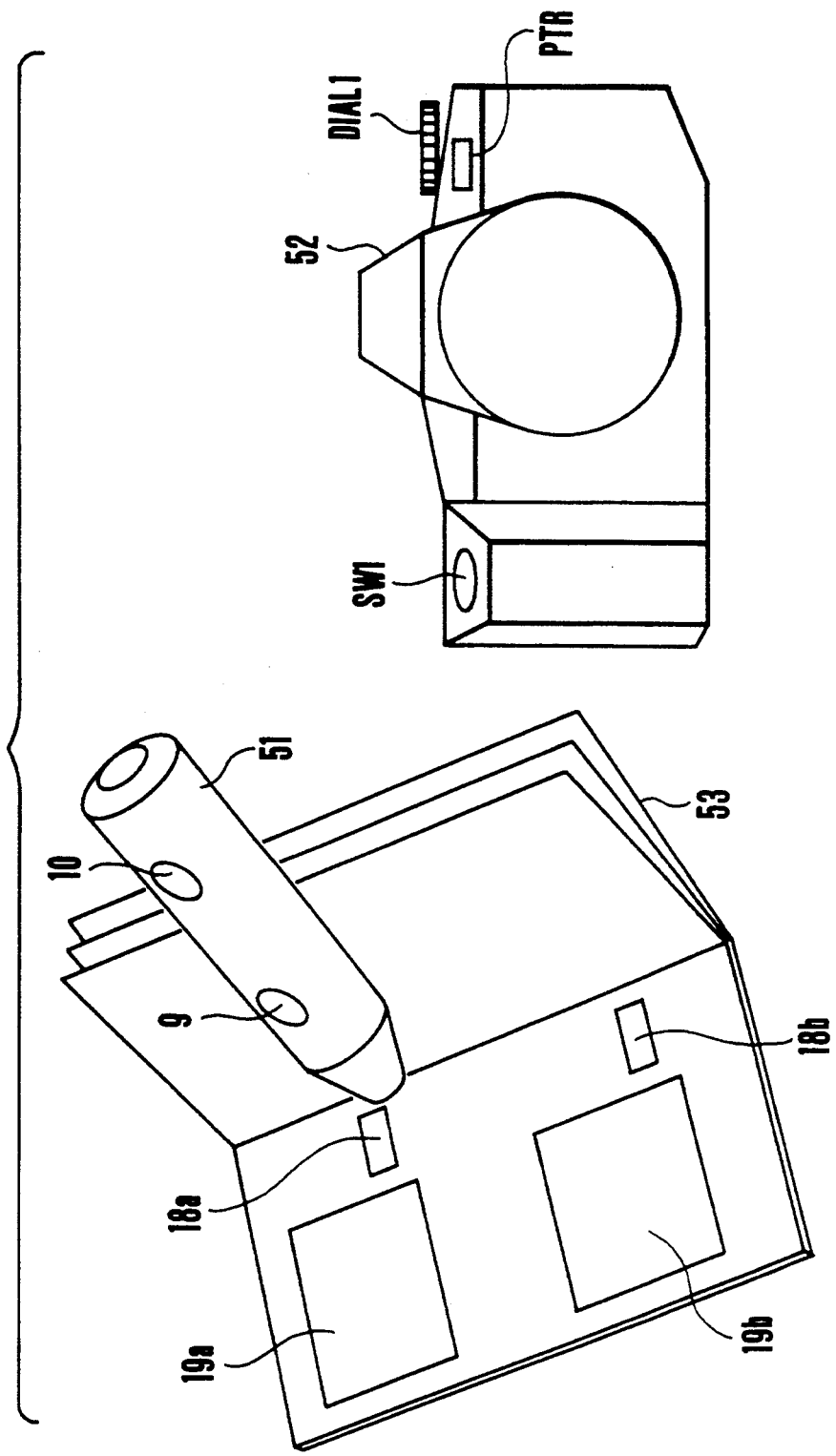
FIG. 2 shows a bar-code reader which is arranged to supply external information to the camera of FIG. 1 and a method for operating the bar-code reader.

In the case of this embodiment described, the bar-code reader 51 is provided with two switches 9 and 10, the IRED 4 and the SPD 5 which are arranged to serve as a code reading part, and the data transmitting IRED 8. On the side of the camera body 52, the phototransistor PTR is arranged to receive the data. A bar-code list 53 which is shown in FIG. 2 is arranged to be used in combination with the bar-code reader 51 and the camera body 52. In the bar-code list 53, bar-code display parts 18a and 18b and photograph examples 19a and 19b which are indicated by these displays are printed. A bar code can be read out by tracing the bar-code display part 18a or 18b with the bar-code reader 51.

The bar code of the bar-code display part 18a or 18b consists of thin lines which are called narrow bars, thick lines which are called wide bars, narrow spaces which are provided between bars, and wide spaces which are provided between bars. The narrow bar and the narrow space each correspond to "0", while the wide bar and the wide space each correspond to "1". The ratio between the width of the narrow space and that of the narrow bar is set at 1:1, and the ratio between the width of the narrow bar and that of the wide bar is set at 1:3. FIGS. 3(a) and 3(b) show by way of example the bar-code display parts 18a and 18b. As shown in FIGS. 3(a) and 3(b), the bar code always begins with a combination of two narrow bars and a narrow space (hereinafter referred to as the start bar) and ends with a narrow space interposed between a wide bar and a narrow bar (hereinafter referred to as the end bar). Data is written between the start bar and the end bar. Each unit of the data consists of five bars and five spaces corresponding to the five bars. Each unit denotes a Figure of one digit.

For example, in the case of the bar-code display part 18a shown in FIG. 3(a), "00110" and "−01001" are shown by bars following the start bar with each narrow bar denoting "0" and each wide bar denoting "1". Meanwhile "10001" and "01001" are likewise shown by spaces. The bar-code display part 18a shown in FIG. 3(a) thus shows a bar code denoting (decimal) "01" "26" "01". The bar-code display part 18b shown in FIG. 3(b) likewise shows a bar code denoting "04" "22" "15".

The following describes a bar-code reading action with reference to FIGS. 4(a) and 4(b) which are flowcharts: As mentioned in the foregoing, the bar-code display part 18a or 18b is in a state of showing bars when the output of the bar-code detecting circuit 3, i.e., the input to the input port P13 of the MCU 1, is at a high level, and in a state of showing spaces when the output level of the bar-code detecting circuit 3 is low. In the case of this embodiment, the RAM disposed in the MCU 1 is provided with six registers T0, T1, T2, n, D1 and D2.

At a step 100, the flow of the bar-code reading action waits for the detection of the first bar. At steps 101 to 103, the time of the first narrow bar is measured. At steps 104 to 106, the time of a narrow space is measured. At steps 107 to 109, the time of the next narrow bar is measured. At a step 110: The largest value obtained by the time measurement is multiplied by 1.5 to obtain a time value T0, which is used for discrimination between narrowness and wideness.

Upon completion of the process of measuring the time T0 by using the start bar, the flow comes to a step 111. At the step 111, the flow waits for detection of a next bar. Upon detection of the next bar, the flow comes to a step 121. At the step 121, registers for data are cleared. At a step 122, the timer is cleared and a data reading process begins. At steps 123 and 124, the time of a bar is read. At a step 125, data of the register D1 is multiplied by two. At a step 126, a check is made to find if the time of the bar thus obtained is longer than the time T0. If so, the bar is considered to be "1" and the flow comes to a step 127. At the step 127, "1" is added to the data of the register D1. At steps 128 and 129, the time of a space is read. A check is made likewise to find if the time of the space is longer than the time T0. If so, the space is considered to be "1". Steps 130 to 141: Processes are carried out in a manner similar to the above-stated processes.

Step 142: Every time a pair of bar and space is read out, the register n is incremented by one. Steps 123 to 143: Reading the bars and spaces is repeated. When the value of the register n is found to have reached "5" at the step 143, reading of one digit is considered to have come to an end and the flow comes to a step 144. Steps 144 and 145: The values of the data registers D1 and D2 are stored in memories M1 and M2, and then, the registers D1 and D2 are cleared. At a step 146, the register n is cleared. Reading processes for six digits are carried out in the same manner as described above.

Steps 150 and 151: The timer is checked for an overflow. If the overflow is found, the bar-code reading action is considered to have come to an end.

In the event of detection of the overflow at the step 150, the overflow is considered to be in error and the flow comes back to the step 100 to repeat the steps from the step 100. If the overflow is detected at the step 151, the flow comes to a step 152 to make a check to find if the bar-code reading action has normally come to an end. At the step 152, a check is made for the number of bars. If the number of bars is found as n=1, the bar-code reading action is considered to be normal and the flow proceeds to steps 153 and 154. Steps 153 and 154: The end bar is checked. If the end bar is found to be NG (no good), i.e., to be not a normal end, the bar-code reading action is considered to be in error, and the flow comes back to the step 100 to repeat the steps all over again from the step 100.

At a step 155, "4" is added to the value of the register D1. At a step 156, "2" is added to the value of the register D2. At a step 157, the values of the registers D1 and D2 are collated with values of a table, which is standardized and provided for converting bar-code data from a binary value to a decimal value. At a step 158, if there are no corresponding values in the table, the bar-code reading action is considered to be in error and the flow again comes back to the step 100. If there are corresponding values in the table, the bar-code reading action is considered to have been correctly performed and the flow comes to a step 159. At the step 159, a sound is emitted to inform the operator of the correct reading.

The microcomputer MC1 for controlling the camera is provided with four RAM areas d1, d2, d3 and d4 which are for camera control and thirty RAM areas dn1, dn2, dn3, dn4 and dn5 (n: 1 to 6) which correspond to all the positions of the dial DIAL1 except a lock position and are provided for storing data sent from an external information reading device. The microcomputer MC1 stops performing camera control actions when the dial DIAL1 is in its lock (n=0) position.

With the embodiment arranged as described above, when the dial DIAL1 is rotated, the microcomputer MC1 sets data to the control RAM area d1, d2, d3 or d4 according to the position of the dial DIAL1 and controls the camera according to the value of the data. In this case, if there is any data inputted from the external information reading device (bar-code reader) 51 to the RAM area (one of the RAM areas dn1 to dn5) which corresponds to the position of the dial DIAL1, the content of the RAM area dn1, dn2, dn3 or dn4 having this data input is set in the control RAM area d1, d2, d3 or d4. If there is no data inputted from the outside, data is set according to a table which is shown in FIG. 9.

The presence or absence of data input is determined as follows: The data input is determined to be present if the RAM area dn5 is not at "0" and to be absent if the RAM area dn5 is at "0". In the initial stage of operation, the RAM area dn5 is at "0" as there is naturally no input and, therefore, the camera is controlled according to the contents of the table of FIG. 9.

Figure 6:
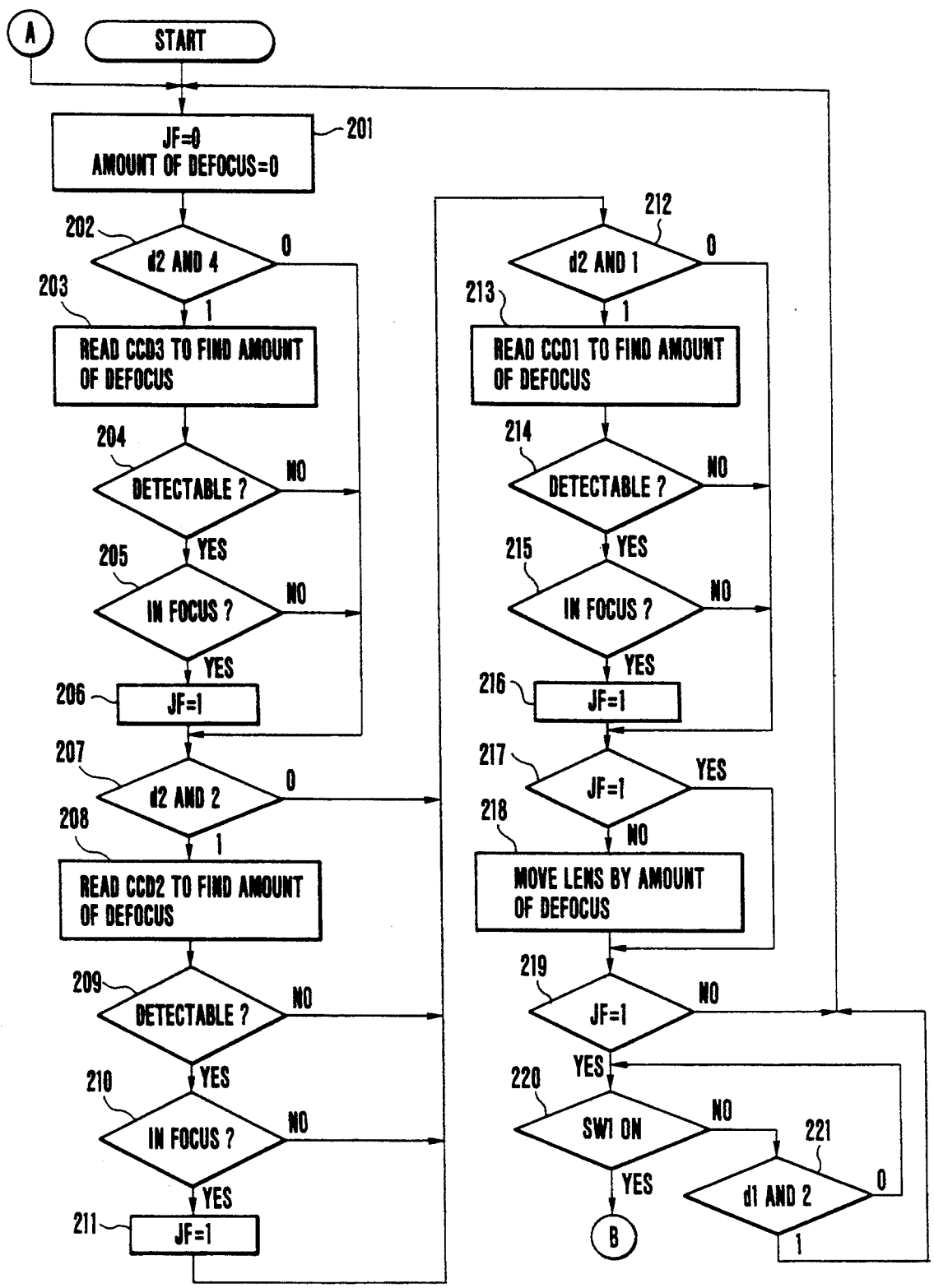
FIGS. 6 and 7 are flowcharts showing in detail the photographing operation of the camera.

Assuming that a close-up mode (n=4) is selected, the camera control is performed as described below with reference to flowcharts of FIGS. 6 and 7:

At a step 201, an initial setting action is first performed to set an in-focus flag JF at "0". Then, a check is made to find whether or not a distance measuring action is to be performed for each distance measuring point on the basis of the value of data d2. Step 202: In the case of this embodiment, the check is first made to find if the distance of the right distance measuring point is to be measured. If so, the flow of control comes to a step 203. Step 203: The value of the line sensor CCD 3 is read to obtain an amount of defocus. Steps 204 and 205: A check is made to find if distance measurement is possible or if an in-focus state is attained. If not, the flow comes to a step 207. If an in-focus state is attained, the flow comes to a step 206. Step 206: The in-focus flag JF is set at "1". The same action is performed for other distance measuring points. Steps 207 to 211 are provided for the left distance measuring points and steps 212 to 216 for the central distance measuring point. Therefore, the in-focus flag JF becomes "1" if any of the distance measuring points selected is in focus. The amount of defocus can be also obtained for any distance measuring point selected.

If no in-focus state is attained, the flow comes to a step 218 to move the lens as much as the amount of defocus. This action is repeated until an in-focus state is attained.

As apparent from the table of FIG. 9, the value of the data d2 is "1" in this instance. Therefore, in accordance with the table of FIG. 5, the left and right distance measuring points are not selected and the distance measuring action is performed only for the central distance measuring point. At a step 219, when an in-focus state is thus attained, the flow comes to a step 221 to wait until the release switch SW1 is pushed in the case of a one-shot AF mode, according to the value of the data d1. In the event of a servo mode, the flow comes back to the initial setting step 201 to repeat the processes of steps from the step 201.

Step 223: Since the value of the data d1 is "4" in this instance, one-shot action is performed. The flow waits until the release switch SW1 is pushed. When the release switch SW1 is pushed, the light measuring range is selected according to the value of data d1. Step 224 or 225: The output value of the silicon photodiode SPD1 or SPD2, is read out to obtain the luminance of the object to be photographed. Since d1=4 in this instance, the output value of the silicon photodiode SPD2 is read.

Step 226: The AE (automatic exposure control) mode is determined according to the value of data d3. If the value of the data d3 is "0" as in an ordinary case, the flow comes to a step 227. Step 227: The amount of exposure compensation is set according to the value of the data d4. Step 228: The arithmetic operation of an exposure program is carried out on the basis of the set compensation value. Step 229: If the value of the data d3 is "3", the flow comes to a step 230. Step 230: An amount of flash-control compensation is set according to the value of the data d4 and is sent to the D/A converter FL1 through the bus line BUS5. Step 231: The arithmetic operation of a flash program is carried out. Step 232: If the value of the data d3 is "1", the flow comes to a step 233. Step 233: A shutter time value TV is set according to the value of the data d4. Step 234: An arithmetic operation is performed to obtain an aperture value AV. Step 235: If the value of the data d3 is "2", an aperture value AV is set according to the value of the data d4. Step 236: An arithmetic operation is performed to obtain a shutter time value TV. Since the value of data n is assumed to be "4" in this instance, d3=2 and d4=4 (see FIG. 9). Therefore, the aperture value AV is set at f5.6 at the step 235 and the shutter time value TV is computed on the basis of the output of the silicon photodiode SPD1 at the step 236.

Step 237: A diaphragm is controlled according to the aperture value AV thus obtained. Steps 238 and 239: A current is applied to the leading shutter curtain and then a current is applied to the trailing shutter curtain according to the shutter time value (speed) TV obtained. A shutter release action is thus carried out according to the aperture value and the shutter speed obtained in the manner as described above.

Step 240: After the shutter release, the motor M1 is driven to transport (wind) the film and to charge the shutter. The camera is thus readied for a next shutter release. Steps 250 and 251: If the value of the data d1 indicates a single shooting mode, the flow waits until the release switch SW1 is freed from a pushed state. If the value of the data d1 indicates a continuous shooting mode, the flow immediately comes back to the step 201 to repeat the steps described above. However, since the value of the data d1 is assumed to be "4" indicating the single shooting mode in this instance, the flow waits until the release switch SW1 is freed before the flow comes back to the step 201.

With the dial DIAL1 which is arranged as shown in FIG. 8 rotated to set the camera in the close-up shooting mode, the camera is controlled as described above in a manner suited for a close-up shot.

When the bar code of the bar-code display part 18a shown in FIG. 3(a) is read, the embodiment operates as follows: As mentioned in the foregoing, the bar code of the bar-code display part 18a represents Figures of six digits "012601" as data. This data indicates the details of control over the camera by each of the digits. The details of control are arranged as shown in FIG. 5 in the same manner as the data of the RAM disposed in the camera. More specifically, the first digit of the data numerically shows an AF (automatic focusing) mode, a film transport mode and a light measuring mode; the second digit the selection of a distance measuring point; the third digit an AE mode; and the fourth digit a value set for the AE mode shown by the third digit. In the case of "012601", for example, what is represented by the data is as follows: The "0" in the first digit indicates a one-shot AF mode, a film transport mode for single shooting and a center-weighted light measuring mode. The "1" in the second digit indicates a mode of measuring the distance of a central distance measuring point. The "2" in the third digit indicates an AV priority AE (automatic exposure) mode. The "6" in the fourth digit indicates that the automatic exposure control designated by the third digit is to be carried out at an aperture value of f2.8.

When a picture 19a is selected from the bar-code list 53 shown in FIG. 2, the bar-code display part 18a corresponding to the selected picture 19a is traced with the bar-code reader 51 to read the bar-code display part 18a while pushing the switch 9 of the bar-code reader 51. With the switch 9 pushed, the MCU 1 of the bar-code reader 51 makes the level of its output port P21 high to turn on the transistor 6. With the transistor 6 turned on, the IRED 4 lights up. At the same time, the MCU 1 performs the bar-code reading action as mentioned in the foregoing. Since the bar-code display part 18a denotes "012601" in this case, the value of the data is read by the MCU 1.

Next, when another switch 10 is pushed, the MCU 1 converts every two digits of the data, like "01" and "26", into BCD codes and outputs the BCD codes from the SCI of the MCU 1. This output turns on the transistor 7 to light up the IRED 8. The infrared rays emitted by the IRED 8 is detected by the phototransistor PTR. The output of the transistor PTR becomes the same as the output of the SCI of the MCU 1 and is supplied to the SCI of the microcomputer MC1 which is disposed on the side of the camera body 52. The data "012601" is thus received by the microcomputer MC1 of the camera body 52. At the microcomputer MC1, the data thus received is stored in each of the areas dn1, dn2, dn3, dn4 and dn5 of the internal RAM corresponding to the positions of the dial DIAL1. In this instance, what is stored in the RAM area dn5 is the last two digits "01" of the data.

In a case where the dial DIAL1 is in the position of n=3, the rotary switch SW2 causes the input port P3 of the micromputer MC1 to be at a low level. The display driving circuit DD1 then causes the content "00" of the RAM area d35 to be displayed on the display device DISP1. When the bar-code display part 18a is read and the data obtained is transferred under this condition, the microcomputer MC1 sets data "0", "1", "2", "6" and "01" respectively in the RAM areas d31, d32, d33, d34 and d35 which correspond to the position n=3 of the dial DIAL1. The camera then comes to display on the display device DISP1 the content "01" of the RAM area d35. Next, if the dial DIAL1 is set in another position n=4 for reading the bar-code display part 18b, "0",  "4", "2", "2" and "15" are likewise set respectively in the RAM areas d41, d42, d43, d44 and d45.

When the camera is actuated with the dial DIAL1 set in the position n=3, the values of the RAM areas d31, d32, d33 and d34 which correspond to the position n=3 are shifted respectively to the control RAM areas d1, d2, d3 and d4. The microcomputer MC1 then performs control in accordance with the contents of the control RAM areas (in the same manner as described in the foregoing). In a case where the dial DIAL1 is set in the position n=4, the camera is controlled with the values of the RAM areas d41, d42, d43 and d44 shifted respectively to the control RAM areas d1, d2, d3 and d4.

Further, the camera may be controlled according to the table of FIG. 9 with the RAM set to be dn5=0 by inputting a bar code which is shown in FIG. 10.

The embodiment thus enables the camera to be controlled in accordance with the bar code the contents of which are variable with the position of the dial.

The items of control over the camera are not limited to the items described in the foregoing. The control items may be replaced with any other items as long as they have heretofore been arranged to be selectable by the photographer.

The embodiment described is arranged to control the different kinds of control information on the basis of a single bar code. However, it is not always necessary to cover all the different kinds of control information by a single bar code. It is possible to transmit only one kind of control information by one bar code.

In the case of the embodiment described, the bar code is arranged to denote photographic data based on a pictorial example of shot. However, the invention is not limited to this. This method may be replaced with any other method that permits one-to-one correlation with a photograph and permits easy conversion into an electrical signal. For example, the method may be replaced with the recent popular method of writing data into a magnetic card which has a photograph printed on its surface.

While a photograph (or a print) is used as the pictorial example of shot, any other visible matter is usable as the example. For example, an image of a picture is inserted as an image on a video tape; while data which is the same as the data used for the embodiment described is inserted in the sound (audio) part in a state of having been modulated with a specific frequency; the reader 51 of the embodiment is modified by replacing the SPD with a microphone and by arranging the detecting circuit 3 to correspond to the change. This modification enables the camera to perform shooting in the same manner as the embodiment with the reader 51 actuated upon detection of a part of the video tape having a desired image while watching the video tape on a video system.

Further, any desired bar code can be readily selected from among many bar codes by classifying the bar codes by photographing conditions and by attaching to these bar codes (see FIGS. 3(a) and 3(b)) the same shooting-condition indicating marks as those of the dial of FIG. 8. Further, if these bar codes are inputted beforehand to the applicable positions of the dial (for example, the bar code of FIG. 3(a) is inputted to the portrait position of the dial), one of the bar codes can be readily selected even in a case where the camera is arranged to have a plurality of bar code inputs thereto.

In the case of the embodiment described, the difference between the control by the camera itself and the control to be performed in accordance with an input from an information input device lies only in the data to be used. However, the control arrangement may be changed completely, for example, to be performed by selecting one of different program diagrams in a case where there is no input from the information input device.

Further, the embodiment described is arranged to have a specific data input in order to inhibit any control from being performed according to an input from the information reader. This arrangement may be changed to provide the camera with an operation member for that purpose and to bring the RAM of the microcomputer MC1 into the state of dn5=0 when the operation member is operated.

The arrangement of the embodiment described enables the camera to have various control items, such as the AF mode, the film transport mode, etc., simultaneously set according to a pattern of photographic conditions selected by an external operation. Further, the photo-taking operation of the camera can be corrected as desired by the operator by inputting information from the external information supply device. Therefore, the embodiment permits the operator to appropriately take pictures under various photographing conditions without necessitating any increase in the number of operation members for correction of the photo-taking operation of the camera.

What is claimed is:

1. A camera system comprising:
   a camera body; and
   an information supply device,
   wherein said camera body comprises:
      selection means, including an operation member, for selecting, by operating said operation member, a prestored set of a plurality of control items for photographing;
      input means for inputting correction information from said information supply device; and
      correction means for correcting at least one control items of the prestored set of a plurality of control items currently selected by said selection means, on the basis of the correction information inputted from said information supply device, and
   wherein said information supply device comprises:
      information forming means for forming the correction information to be used for correcting at least one control item of the prestored set of a plurality of control items selected by said selection means of said camera body; and
      supply means for supplying the correction information to said camera body.

2. A camera system according to claim 1, wherein the prestored set of a plurality of control items is one of a plurality of combination sets, and wherein one of the plurality of combination sets is selectable by operating said operation member.

3. A camera system according to claim 1, wherein the prestored set of a plurality of control items comprises focus control and exposure control.

4. A camera system according to claim 2, wherein the prestored set of a plurality of control items comprises focus control and exposure control.

5. A camera system according to claim 1, wherein said input means of said camera body comprises means to receive a light signal, and wherein said supply means of said information supply device is arranged to output the light signal.

6. A camera system according to claim 5, wherein the prestored set of a plurality of control items is one of a plurality of combination sets, and wherein one of the plurality of combination sets is selectable by operating said operation member.

7. A camera system according to claim 5, wherein the prestored set of a plurality of control items comprises focus control and exposure control.

8. A camera system according to claim 1, wherein said information supply device further comprises a barcode reader arranged to read external bar code information and to form the correction information according to the bar code information.

9. A camera system according to claim 8, wherein the prestored set of a plurality of control items is one of a plurality of combination sets, and wherein one of the plurality of combination sets is selectable by operating said operation member.

10. A camera system according to claim 8, wherein said information supply device further comprises a light source to output a light signal containing correction information and wherein said input means of said camera body comprises means to read the light signal.

11. A camera system according to claim 2, wherein said operation member comprises a rotatable member.

12. A camera system according to claim 11, wherein the prestored set of a plurality of control items is selectable by turning said rotatable member.

13. A camera capable of inputting correction information from an information supply device by communication, comprising:
   a) selection means including an operation member for selecting, by operating said operation member, a prestored set of a plurality of control items for photographing;
   b) input means for inputting the correction information from the information supply device; and
   c) correction means for correcting at least one control item of the prestored set of a plurality of control items currently selected by said selection means, on the basis of the correction information inputted from the information supply device.

14. A camera according to claim 13, wherein the prestored set of a plurality of control items is one of a plurality of combination sets, and wherein one of the plurality of combination sets is selectable by operating said operation member.

15. A camera according to claim 14, wherein the prestored set of a plurality of control items comprises focus control and exposure control.

16. A camera according to claim 13, wherein the information supply device further comprises a light source to output a light signal containing correction information and wherein said input means comprises means to receive the light signal.

17. A camera according to claim 14, wherein said operation member comprises a rotatable member.

18. A camera according to claim 17, wherein the prestored set of a plurality of control items is selectable by turning said rotatable member.

* * * * *

UNITED STATES PATENT AND TRADEMARK OFFICE
CERTIFICATE OF CORRECTION

PATENT NO. : 5,343,267
DATED : August 30, 1994
INVENTOR(S) : Kazumi

It is certified that error appears in the above-indentified patent and that said Letters Patent is hereby corrected as shown below:

<u>IN THE DRAWINGS</u>

<u>Sheet 7 of 8</u>

Figure 7:
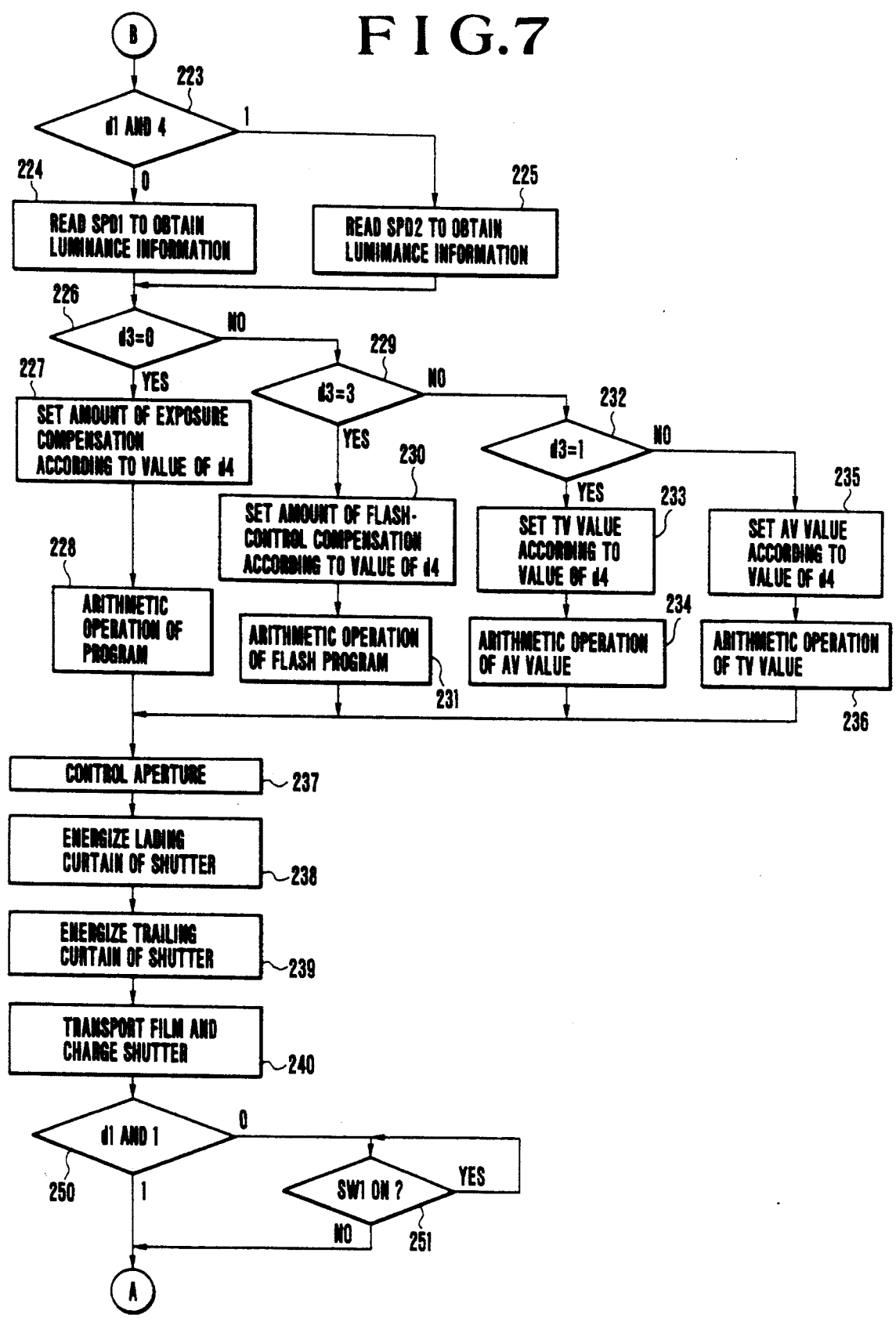

Fig. 7, "LUMIMANCE" should read --LUMINANCE-- and "LADING" should read --LEADING--.

<u>Column 4</u>

Line 6, "microcomputer MC 1," should read --microcomputer MC1,--.

<u>Column 5</u>

Line 48, "Figure" should read --figure--.

<u>Column 9</u>

Line 2, "Figures" should read --figures--.

UNITED STATES PATENT AND TRADEMARK OFFICE
CERTIFICATE OF CORRECTION

PATENT NO. : 5,343,267
DATED : August 30, 1994
INVENTOR(S) : Kazumi

It is certified that error appears in the above-indentified patent and that said Letters Patent is hereby corrected as shown below:

Column 11

Line 41, "items" should read --item--.

Signed and Sealed this

Twenty-eight Day of February, 1995

Attest:

BRUCE LEHMAN

Attesting Officer     Commissioner of Patents and Trademarks